United States Patent Office 3,236,816
Patented Feb. 22, 1966

3,236,816
POLYURETHANES FROM A DIAMINE AND A DIOL HAVING A NORBORNANE (NORCAMPHANE) NUCLEUS
John R. Caldwell and Winston J. Jackson, Kingsport, Tenn., assignors to Eastman Kodak Company, Rochester, N.Y., a corporation of New Jersey
No Drawing. Filed Feb. 24, 1965, Ser. No. 435,065
10 Claims. (Cl. 260—77.5)

This application is a continuation-in-part of copending applications Serial No. 237,331 filed on November 13, 1962, and Serial No. 260,867, the latter being a continuation-in-part of Serial No. 843,926, filed October 2, 1959; all of these are now abandoned.

This application is related to our copending application Serial No. 237,314 filed on November 13, 1962, now U.S. Patent No. 3,184,435. The polymers of the present application and those of said patent differ in structure in the same sense that polyamides and polyesters differ, even though they can both be derived from dicarboxylic acids. Moreover, the polyamide from isophthalic acid and hexamethylenediamine melts at 208° C. whereas the inverse polyamide from m-xylene-diamine and adipic acid melts at 244° C.; hence such polyamides are quite clearly independent in a patentably distinct sense even though their structures appear to be essentially mirror images of each other. This is analogous to a comparison of the polymers of this application and those of said Serial No. 237,314.

This invention relates to a new and distinct class of high molecular weight linear polymers useful in the production of moldable plastic products and films as well as fibers, filaments and yarns and more particularly to novel polyurethanes containing a norcamphane ring which can also be called a norbornane ring and characterized by an unusual degree of hardness as compared to polyurethanes of the applicable prior art.

Many polyurethanes have been previously reported and certain of these compositions have been found suitable for the production of various products such as fibers, filaments, yarns and various plastic products. Such compositions and related processes are described, for example, in British Patent 685,729 and in U.S. Patent 2,660,-574, U.S. 2,660,575, U.S. 2,731,446 and U.S. 2,900,368. However, such polyurethanes have been found to be defective for certain practical applications, particularly in the production of molded products and films because of the fact that they are lacking in the required degree of hardness with the result that products produced therefrom display a tendency toward scratching, scuffing, and denting when subjected to contact with roughened surfaces or the impact of metallic and other hard objects. This has seriously lessened their usefulness, particularly in the field of molding. Moreover, other art which discloses norcamphane or norbornane derivatives such as U.S. Patent 2,952,666 and U.S. 2,926,145 do not suggest the valuable attributes which the present invention discloses with respect to polyurethanes having exceptional hardness characteristics. There is no reasonable basis for combining any of these references, some of which are not prior to this invention.

This invention has as an object to provide a new class of polyurethanes useful in the production of moldable plastic products and films and in the production of fibers, filaments and yarns.

Another object is to provide a new class of polyurethanes which have an unusual degree of surface hardness as compared to known polyurethane moldable and film-forming compositions, and characterized by a high degree of resistance to scratching, scuffing, denting, marring and the like.

Other objects will appear hereinafter.

These objects are accomplished by the following invention which is based upon the surprising discovery that a polyurethane containing a norcamphane or norbornane ring has an unusual degree of hardness and effectively resists scratching, scuffing, denting, marring and other adverse effects when products produced therefrom are subjected to surface friction by roughened surfaces of various kinds and to denting upon the impact of metallic and other hard objects thereon.

The new class of linear polyurethanes are characterized by the following recurring structural unit:

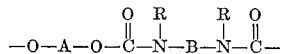

wherein A represents a divalent norcamphane (norbornane) radical selected from the group consisting of those having the following formulas:

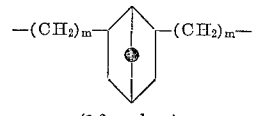

(2,6-nucleus)

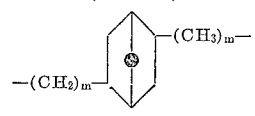

(2,5-nucleus)

and

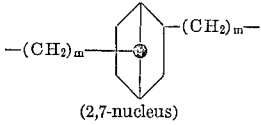

(2,7-nucleus)

where each $m$ represents a cardinal number of from 0 to 1, B represents a divalent aliphatic, alicyclic, aromatic or heterocyclic group such as the atoms necessary to form a piperazine ring which can have alkyl substituents. Examples include a straight or branched chain alkylene group containing from 2 to 20 carbon atoms such as a —$(CH_2)_n$— group wherein $n$ is an integer of from 2–20; a —$CH(CH_3)$— group, a —$CH(CH_3)CH_2$— group, a —$CH(C_2H_5)CH_2$— group, a

—$CH_2CH(CH_3)CH(CH_3)CH_2$— group, a —$CH_2CH(C_{11}H_{23})CH_2$— group, etc.; a monocycloalkylene group containing from 5–8 carbon atoms such as a 2,2,4,4-tetramethyl-1,4-cyclobutylene group, a cyclopentylene (—$C_5H_8$—) group, a cyclohexylene (—$C_6H_{10}$—)

group, a 1,4-cyclohexylenebismethylene group

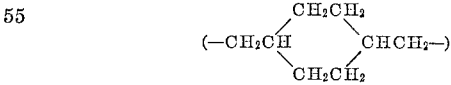

and others represented by A hereinabove, etc. Those polyurethanes where B represents norcamphylene and norcamphylenedimethylene are disclosed and claimed in copending application Serial No. 237,314 which is mentioned in the second paragraph of this specification hereinabove. Further examples of groups which B can represent include an arylene group containing from 6–10 carbon atoms such as phenylene, the tolylenes, the xylylenes, biphenylenes, the naphthylenes, an arylenebismethylene group such as m-xylylenebismethylene

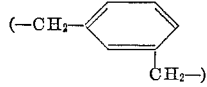

etc.; and groups such as represented by the following general formula:

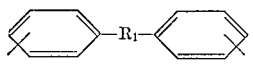

wherein $R_1$ represents a divalent atom or group such as —O—, —S—, —SO—, —SO$_2$—, —SO$_2$NR—, —CO—, —COO—, —COCO—, —CF$_2$—, —CH=CH—, —C=C—, —OCH$_2$CH$_2$O—, —NR—, —CONR— —NRNR—, —R$_2$C—, alkylene, substituted alkylene, etc., and wherein R in each occurrence above represents a hydrogen atom or an alkyl group of from 1–4 carbon atoms. The group of atoms: —NR—B—NR— can also represent a piperazine radical having the following formula:

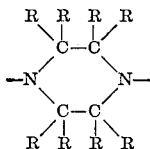

wherein R is a 1–4 carbon atom alkyl radical, or a hydrogen atom. The alkylene or substituted alkylene radicals can have from 2 to 12 carbon atoms. The above-defined linear polyurethanes are excellent plastic materials and particularly useful for the preparation of elastic fibers and films and tough molded articles. They are further characterized by having relatively high softening points in the range of about 190° to 300° C. and higher and are soluble in cresols, dichloroacetic acid and trifluoroacetic acid. Also, many are soluble in dimethylformamide. An especially important property of these polyurethanes is their unexpectedly greater hardness and consequent resistance to scratching, denting and marring.

In accordance with one aspect of this invention, the novel polyurethanes can be prepared by one of the following methods: (1) wherein a norcamphanediol having the formula HO—A—OH is reacted with an approximately equimolar amount of a suitable organic diisocyanate, in an inert solvent having a boiling point in the range of about 100–150° C., for example, m- or p-dioxane (B.P. 105° C. and 101.5° C., respectively), at from about 80° C. up to the boiling point of the solvent, whereby the polymer precipitates from the solution upon cooling or it can be precipitated by pouring the solution into a nonsolvent such as acetone or alcohol; and (2) wherein said norcamphanediol as a bischloroformate is reacted with an equivalent amount of a suitable diamine, but preferably a slight excess of the calculated amount for complete reaction with the bischloroformate, by adding the bischloroformate in a water-immiscible solvent such as methylene chloride, ethylene dichloride, benzene, toluene, etc. to a rapidly-stirred, cooled (about 0°–15° C.) aqueous mixture of an inorganic base or equivalent such as sodium or potassium carbonate, sodium or potassium hydroxide, sodium bicarbonate, calcium oxide, etc. containing the diamine. If the diamine is not water-soluble, it can be dissolved in a water-immiscible solvent such as ethylene dichloride, tetrachloroethane or benzene. Since the resulting mixture is essentially an aqueous dispersion, it is advantageous to employ an emulsifying agent such as a fatty alcohol sulfate. The reaction is exothermic and, accordingly, it is preferable to cool the alkaline solution in an ice-water bath before the addition of the bischloroformate solution. When the diamine is of low molecular weight, such as ethylenediamine, it is preferable to use a large excess (e.g. 100–300%) of an inorganic base (preferably sodium carbonate) and only a small amount of water. This procedure is also helpful with such other diamines as may be very water-soluble. The polymer precipitates almost immediately. In either of the above processes, the precipitated polymer is isolated by conventional separation methods, for example, by collecting on a filter, washing several times with water and drying.

More specifically, a new class of polyurethanes according to one aspect of the present invention can be prepared by reaction of 2,5- and/or 2,6-norcamphanedimethanol bischloroformate and one or more diamines. In forming these new polymers the bischloroformate dissolved in a water-immiscible solvent is added to a rapidly stirred aqueous mixture of sodium carbonate, an emulsifying agent, and a diamine (dissolved in a water-immiscible solvent if not water-soluble). The polymer precipitates almost immediately.

As indicated above the diol bischloroformate dissolved in a water-immiscible solvent is added to a rapidly stirred aqueous mixture of sodium carbonate, an emulsifying agent, and a diamine (dissolved in a water-immiscible solvent if not water-soluble).

An equivalent amount of diamine, or preferably, a slight excess of diamine over the bischloroformate is employed. Sodium bicarbonate, sodium hydroxide, calcium oxide, etc., may be substituted for the sodium carbonate, which is preferred.

Satisfactory water-immiscible solvents are ethylene dichloride, methylene chloride, benzene and toluene. A suitable emulsifying agent is sodium lauryl sulfate although many other known emulsifying agents may also be employed. Since the polymerization reaction is exothermic, it is preferable to cool the alkaline mixture in an ice-water bath before addition of the bischloroformate solution.

Suitable norcamphanediols include those coming within the following general formula: HO—A—OH wherein A is defined above. Examples include 2,5-norcamphanediol, 2,6-norcamphanediol, and 2,7-norcamphanediol.

The 2,5- and 2,6-norcamphanediols may be prepared by reacting bicyclo(2,2,1)hept-5-ene-2-ol acetate with glacial acetic acid in the presence of from 0.1 to 1.0%, based on the weight of the above bicyclo compound, of a catalyst such as perchloric acid or sulfuric acid at refluxing temperature for a period of at least one hour, to give norcamphanediol acetate which is then converted to the diol itself by reaction with sodium methoxide in anhydrous methanol in the conventional ester interchange method. The product is a mixture of the 2,5- and 2,6-isomers and can be employed directly in admixed form for preparing the polyurethanes of the invention or the isomers can be first separated by conventional methods for separating isomers such as fractional distillation, crystallization, etc. The 2,7-norcamphanediol may be prepared as described by K. Adler et al., Liebig's Annalen Org. Chem., 601, page 138 (1956), Chem. Abstracts, 51, page 17827 (1956).

The synthesis of 2,5 (or 2,6)-norbornanedimethanol, used in preparing the bischloroformate, is given in British Patent 766,666. This product is obtained by hydroformylating the Diels-Alder cyclopentadiene-allyl alcohol adduct and then hydrogenating the carboxaldehyde. The hydroformylation reaction may be carried out in benzene at 140° C. in the presence of dicobalt octacarbonyl catalyst, and the resulting aldehyde may be hydrogenated at 60° C. in the presence of Raney nickel.

Suitable norcamphanediol bischloroformates include those coming within the following general formula:

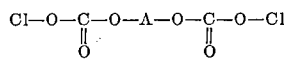

wherein A is defined hereinabove. These compounds can be prepared from the corresponding norcamphanediols having the formula HO—A—OH by treating the diols with phosgene in a solvent medium such as methylene dichloride or ethylene dichloride. If some dioxane (about one-third of the solvent mixture) is added and the temperature raised to 40–50° C., the reaction takes place much faster. The diol dissolves as it reacts. Higher temperatures can be used, but there is a loss of some phosgene, and slight decomposition of the product occurs. After the reaction is completed, dry air is passed into the solution until all of the hydrogen chloride and phosgene have been driven out. This solution can be used directly for the preparation of the polyurethanes of the invention. If the solvent is distilled off under reduced pressure, a quantitative yield of the bischloroformate is obtained. When a mixture of 2,5- and 2,6-norcamphanediol is used, the product is a mixture of the corresponding bischloroformates consisting of a liquid and crystalline portions.

The bischloroformate of the 2,5- and/or 2,6-norcamphanedimethanol can be prepared by adding an excess of phosgene to the diol suspended in ethylene dichloride. After all of the diol has gone into solution, dry air is bubbled through the mixture until all the hydrogen chloride and excess phosgene have been swept out. The bischloroformate solution is then used as needed in the polymerization reactions. Other solvents which may be used instead of ethylene dichloride are methylene chloride, benzene, and toluene.

Suitable diisocyanates include those coming within the general formula:

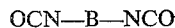

OCN—B—NCO wherein B has the previously defined meaning. Typical diisocyanates include ethylene diisocyanate, trimethylene diisocyanate, hexamethylene diisocyanate, dodecamethylene diisocyanate, propylene-1,2-diisocyanate, 2,3-dimethyltetramethylene diisocyanate, butylene-1,2-diisocyanate, butylene-1,3-diisocyanate, ethylidene diisocyanate, 1,4-cyclohexane diisocyanate, o-, m- and p-phenylene diisocyanates, 1-methyl-phenylene-2,4-diisocyanate, xylylene-1,4-diisocyanates, xylylene-1,3-diisocyanate, 2,6-diethylbenzene-1,4-diisocyanate, naphthalene-1,5-diisocyanate, diphenyl-4,4'-diisocyanate, diphenylmethane-4,4' - diisocyanate, diphenylsulfone-4,4'-diisocyanate, 3,3'-dimethoxy-diphenylmethane-4,4'-diisocyanate, diphenyloxide-4,4'-diisocyanate, diphenylsulfide-4,4'-diisocyanate, diphenylketone-4,4'-diisocyanate, etc.

Suitable diamines include those coming within the general formula:

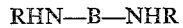

RHN—B—NHR wherein B and R have the previously defined meanings. The diamine may be aliphatic, alicyclic, aromatic or heterocyclic and may be primary or secondary. The aromatic diamines may have both amino groups on the one aromatic ring (e.g. m- or p-phenylene diamine) or on different aromatic rings (e.g. 4,4'-methylenedianiline; 4,4'-diaminodiphenyl; 1,5- or 2,5-naphthalene diamine). The carbon chain of the aliphatic diamines (primary or secondary) may be straight or branched (ethylenediamine; 1,6-hexanediamine; 2,2-dimethyl-1,3-propanediamine, N,N-dimethyl-1,6-hexanediamine; N,N'-dimethyl-2,2-dimethyl-1,4-butanediamine). Amines containing alicyclic or aromatic rings include 1,4-cyclohexanediamine; 1,4-cyclohexanebismethylamine; m- or p-xylylene-α,α'-diamine. Examples of heterocyclic diamines are piperazine, 2,5-dimethylpiperazine, 2,5-dibutylpiperazine, 2,2,5,5-tetramethylpiperazine, and 2,3,5,6-tetramethylpiperazine. Other typical diamines are tetramethylenediamine, hexamethylenediamine, decamethylenediamine, 4,4'-diaminodiphenylsulfone, 4,4'-diaminodiphenylether, 4,4'-diaminodiphenylsulfide, 4,4'-diaminodiphenylketone, and the like. If the diamine is insoluble in water, it should be dissolved prior to use in the reaction in a water-immiscible solvent such as ethylene dichloride or benzene.

The following examples will serve to illustrate further our new linear polyurethanes and the manner of preparing the same.

In the following examples and description we have set forth several of the preferred embodiments of our invention but they are included merely for purposes of illustration and not as a limitation thereof.

All inherent viscosities were measured in 60/40 parts by weight, phenol/tetrachloroethane at about 25° C.

Example 1

A mixture containing 8.0 g. (0.075 mole) of sodium carbonate, 8.4 g. (0.028 mol) of 20.1% aqueous ethylene diamine, 10 ml. of water and 0.5 g. of Duponol (a fatty alcohol sulfate emulsifying agent) was cooled in an ice-water bath. While the mixture was rapidly stirred, 25.0 ml. of an ethylene dichloride solution containing 0.0265 mole of a mixture of the bischloroformates of 2,5- and 2,6-norcamphanediol was added. The polyurethane precipitated almost immediately. After the mixture was stirred for 10 minutes, the polymer was collected, washed several times with water and dried. It melted with decomposition at 293-296° C. and had an inherent viscosity of 0.48. It was useful for preparing fibers, films and molded articles having excellent physical properties and good affinity for commercial dyes.

Example 2

Following the procedure of Example 1 a polyurethane was prepared from 8.0 g. (0.075 mole) of sodium carbonate, 4.0 g. (0.028 mole) of 1,4-cyclohexanebismethylamine; 20 ml. of water, 0.5 g. of Duponol (a fatty alcohol sulfate emulsifying agent), and 6.7 g. (0.0265 mole) of 2,5-norcamphanediol bischloroformate dissolved in 18 ml. of methylene chloride. The polymer had an inherent viscosity of 0.69 and melted at 220-240° C. It had physical properties and utility generally similar to the product of Example 1.

Example 3

When 1,6-hexane diamine (0.028 mole) was substituted for the diamine in Example 2, a polyurethane was obtained with an inherent viscosity of 1.05 and a melting point of 222-232° C. It was useful for preparing fibers and molded articles.

Example 4

When m-xylylene-α,α'-diamine (0.028 mole) and 2,7-norcamphanediol bischloroformate (0.0265 mole) in ethylene dichloride was used in the procedure of Example 1, a polyurethane was obtained with an inherent viscosity of 0.74 and a melting point of 210-220° C. Fibers and molded articles prepared therefrom showed good physical properties and were readily dyeable with commercial dyes.

Example 5

To a mixture of 10.6 grams (0.10 mole) of sodium carbonate, 15 ml. of water, and 0.7 gram of Duponol (a fatty alcohol sulfate emulsifying agent) was added 8.0 grams (0.040 mole) of 4,4'-methylenedianiline dissolved in 20 ml. of ethylene dichloride. While this mixture was rapidly stirred and cooled in an ice-water bath, 40.0 ml. of an ethylene dichloride solution containing 0.040 mole of 2,5-norcamphanediol bischloroformate was added. The polyurethane precipitated immediately. After the mixture was stirred for 10 minutes, the polymer was collected. It was stirred with water, filtered, washed with methylene chloride and dried. It softened at 230-250° C., had an inherent viscosity of 0.72 and gave excellent fibers and molded articles.

Example 6

To a stirred, cooled mixture containing 3.0 g. (0.028 mole) of sodium carbonate, 20 ml. of water, 0.5 g. of Duponol (a fatty alcohol sulfate sulfonating agent), and 7.3 g. (0.0265 mole) of N,N'-dimethyl-4,4'-sulfonyldianiline in 15 ml. of methylene chloride was added 25.0 ml. of an ethylene dichloride solution containing 0.0265 mole of 2,7-norcamphanediol bischloroformate. The polymer which precipitated was collected, washed several times with water and methylene chloride, and dried. It melted at 260-275° C. and had an inherent viscosity of 0.42. Excellent fibers and molded articles were prepared therefrom.

Example 7

A mixture of 0.10 mole of 2,5- and 2,6-norcamphanediol in 25 ml. of dioxane at 80° C. was slowly treated with 0.10 mole of hexamethylene diisocyanate while stirring. The temperature was then slowly raised to the boiling point, and the mixture was refluxed with stirring for 1 hour. The mixture was then cooled and the polyurethane was collected, washed with methylene chloride and dried. It had an inherent viscosity of 0.47, a melting point of 220–230° C. and gave readily dyeable fibers and molded articles.

Example 8

A polyurethane was prepared as in Example 7 from 2,4-tolylene diisocyanate and the diol mixture. It had an inherent viscosity of 0.36 and a melting point of 190–200° C.

Example 9

When methylene di-p-phenyleneisocyanate (p,p'-OCNC$_6$H$_4$CH$_2$C$_6$H$_4$NCO) and 2,7-norcamphanediol were used in the procedure of Example 7, a polyurethane was obtained melting at 270–280° C. It had an inherent viscosity of 0.52. Fibers prepared therefrom had excellent physical properties and good affinity for commercial dyes.

Several of the polyurethanes of the above examples, in film form, were tested for hardness. These films, which were about 3 mils in thickness, were subjected to the Kohinoor hardness test as described in ASTM Bulletin No. 145, March 1947, page 69. This test comprises applying to the films the sharpened point of pencils of various degrees of hardness from soft to hard ranging from 2B, B, HB, F, H, 2H, 3H, etc., to 9H. The hardness index is determined from the numbered pencil which first shows a visible mark on the surface of the film. The hardness values obtained in this manner for the above exemplary polymers are as follows.

| Polymer: | Pencil hardness |
|---|---|
| Example 1 | 3H–2H |
| Example 2 | 3H–2H |
| Example 3 | 2H–H |
| Example 4 | 2H–H |
| Example 5 | 2H–H |
| Example 7 | 2H–H |
| Example 8 | 2H–H |
| Example 9 | 2H–H |

When the 2,5-norcamphanediol bischloroformate of Example 2 was replaced with 1,6-hexanediol bischloroformate, a polyurethane was obtained with a Kohinoor hardness index of only B–2B, which is appreciably lower than the index of the corresponding polymer of Example 2. When the 2,5-norcamphanediol bischloroformate of Example 3 was replaced with 1,4-cyclohexanedimethanol bischloroformate, a polyurethane was obtained with a Kohinoor hardness index of B–2B, which is appreciably lower than the index of the corresponding polymer in Example 3.

The increased hardness of polyurethanes resulting from the incorporation of norcamphane rings in the chain represents an important and unpredictable improvement. The advantages of the hard materials of this invention, compared to the softer compositions which do not contain norcamphane rings, are obvious: less scratching, less scuffing, less denting, greater wear resistance, and greater resistance to marring in general. Such characteristics are very important in polymers to be fabricated into shaped articles, films, and sheets.

By proceeding as described in the above examples, other generally similar polyurethanes may be prepared from any of the mentioned intermediates coming within the invention. If desired, the solutions or melts of the polyurethanes may be modified by incorporating therein various fillers, dyes, pigments, plasticizers, and the like. All of the polyurethanes of the invention are thermoplastic and can be readily fashioned into fibers and sheets by coating or spinning from solvents or by melt spinning and extrusion techniques and can also be molded into stable, shaped articles by conventional molding methods. The sheet materials are suitable as photographic film supports.

Example 10

A mixture containing 10.6 g. (0.10 mole) of sodium carbonate, 15 ml. of water, 6.0 g. (0.042 mole) of 1,4-cyclohexanebis(methylamine), and 0.7 g. of sodium lauryl sulfate (emulsifying agent) was cooled in an ice-water bath. While the mixture was rapidly stirred, 40.0 ml. of an ethylene dichloride solution containing 0.040 mole of 2,5 (or 2,6)-norcamphanedimethanol bischloroformate was added. The polyurethane precipitated almost immediately. After the mixture was stirred for 10 min., the polymer was collected, washed by stirring with water and methylene chloride, and dried. It melted at 180–190° C. and had an inherent viscosity of 0.63.

The polyurethane product could be formed into various molded products by any of the standard molding processes such as injection molding and the like. A sample of the polyurethane of Example 10 was pressed into the form of a sheet 0.003 inch in thickness and was found to have a hardness index of 3H–2H when subjected to the so-called Kohinoor hardness test as described in the ASTM Bulletin No. 145, March 1947, page 69. As indicated, the hardness of the polyurethane plastic material of our invention had a hardness of 3H–2H, whereas a similar film pressed from a polyurethane prepared from the above diamine and 1,9-nonanediol bischloroformate had a hardness index by this same test of only B–2B. It is thus clear that the above novel polyurethane of the present invention has a surface hardness very much greater than the prior art product.

Example 11

A polyurethane was prepared from ethylenediamine according to the method of Example 10. It melted at 230°–240° C., had an inherent viscosity of 0.87 and a hardness index of 3H–2H.

Example 12

A polyurethane was prepared from m-xylene-α,α'-diamine according to the procedure of Example 10. It melted at 160°–180° C., had an inherent viscosity of 0.52 and a hardness index of 2H–H.

Example 13

A polyurethane was prepared from 2,2-dimethyl-1,3-propanediamine according to the procedure of Example 10. It melted at 170–200° C., had an inherent viscosity of 0.61 and a hardness index of 2H–H.

Example 14

When 4,4'-methylenedianiline was used as the diamine, the procedure of Example 10 was modified slightly since the diamine is not water-soluble. The diamine (8.0 g., 0.040 mole) was dissolved in 20 ml. of ethylene dichloride before adding to the aqueous sodium carbonate. The polyurethane melted at 200–220° C. and had an inherent viscosity of 0.76. Its hardness index was 2H–H.

Example 15

The method of Example 14 was used in preparing a polyurethane from m-phenylenediamine. The polyurethane melted at 180–200° C. and had an inherent viscosity of 0.82. Its hardness index was 2H–H.

Example 16

A polyurethane was prepared from piperazine according to the procedure of Example 10. It melted at 280–300° C., had an inherent viscosity of 0.92 and a hardness index of 3H–2H.

By following the procedure of the above Examples 10–17 other polyurethanes and copolyurethanes may be prepared from the norcamphanedimethanol bischloroformates and any of the mentioned diamines. The products have properties generally similar to those of the products described in the examples. The products of the invention are thermoplastic and on melting give homogeneous clear dopes which can be readily converted by melt-spinning to fibers, by injection molding to shaped articles, and by extrusion to clear flexible sheets and films. The latter products are useful, among other things, for photographic film supports. The shaped articles, sheets, and films are particularly valuable because they have very hard surfaces which are resistant to scratching, scuffing, and denting when subjected to contact or impact with hard objects. If desired, various fillers, pigments, dyes, lubricants, plasticizers, etc., can be incorporated into the polyurethane products of the invention.

The invention has been described in detail with particular reference to preferred embodiments thereof, but it will be understood that variations and modifications can be effected within the spirit and scope of the invention as described hereinabove and as defined in the appended claims.

From the above description it is apparent that this invention provides novel and unexpectedly valuable synthetic resins such as a resinous polyurethane substantially composed of the following repeating units:

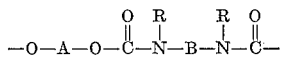

wherein A represents a divalent norcamphane (norbornane) radical selected from the group consisting of those having the following formulas:

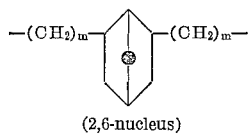

(2,6-nucleus)

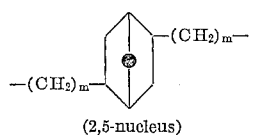

(2,5-nucleus)

and

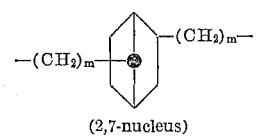

(2,7-nucleus)

where each $m$ represents a cardinal number of from 0 to 1, B represents a divalent radical selected from the group consisting of a straight chain alkylene radical containing from 2 to 20 carbon atoms, a branched chain alkylene radical containing from 2 to 20 carbon atoms, a monocycloalkylene radical containing from 5 to 8 carbon atoms, a nuclearly substituted arylene radical containing from 6 to 10 carbon atoms, an arylenebismethylene radical containing from 8 to 12 carbon atoms, a bisphenylene radical having the formula:

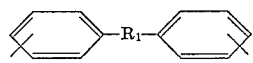

wherein $R_1$ represents a divalent radical selected from the group consisting of —O—, —S—, —SO—, —SO$_2$—, —SO$_2$NR—, —CO—, —COO—, —CF$_2$—, —C=CH—, —C≡C—, —OCH$_2$CH$_2$O—, —NR—, —CONR—, —R$_2$C—, straight chain alkylene radicals having from 1 to 8 carbon atoms, branched chain alkylene radicals having from 2 to 8 carbon atoms and cycloalkylene radicals having from 5 to 9 carbon atoms, said bisphenylene radical being connected at positions selected from among the meta and para positions, and, as the last to be selected member of the group, B represents those atoms such that

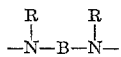

is a radical having the formula:

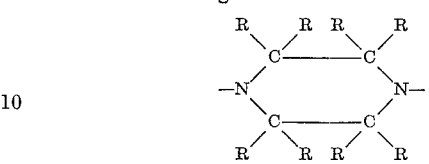

and R in each occurrence above represents a member selected from the group consisting of a hydrogen atom and an alkyl group having from 1 to 4 carbon atoms, said polyurethane being characterized in that a film thereof has a Kohinoor hardness of at least 2H–H.

These resinous polyurethanes are particularly valuable when they are also characterized by an inherent viscosity of at least 0.3 and have a softening point above 190° C.

In the working examples and description set forth hereinabove, the employment of mixtures of isomers is believed to have involved a mixture wherein the isomeric proportions were approximately equal with the predominant amount being the 2,5-isomer, i.e. a ratio of perhaps 45% of 2,6-isomer and 55% of 2,5-isomer. However, the applicants do not intend to be restricted by their evaluation as to such probable proportions and their invention covers any of the named isomers alone as well as any mixtures thereof.

We claim:

1. A resinous polyurethane substantially composed of the following repeating units:

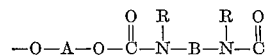

wherein A represents a divalent norcamphane (norbornane) radical selected from the group consisting of those having the following formulas:

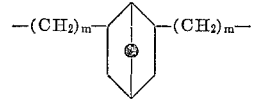

(2,6-nucleus)

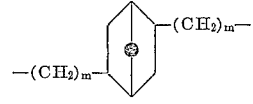

(2,5-nucleus)

and

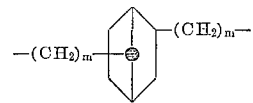

(2,7-nucleus)

where each $m$ represents a cardinal number of from 0 to 1, B represents a divalent radical selected from the group consisting of a straight chain alkylene radical containing from 2 to 20 carbon atoms, a branched chain alkylene radical containing from 2 to 20 carbon atoms, a monocycloalkylene radical containing from 5 to 8 carbon atoms, a nuclearly substituted arylene radical containing from 6 to 10 carbon atoms, an arylenebismethylene radical containing from 8 to 12 carbon atoms, a bisphenylene radical having the formula:

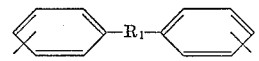

wherein $R_1$ represents a divalent radical selected from the group consisting of —O—, —S—, —SO—, —SO$_2$—, —SO$_2$NR—, —CO—, —COO—, —CF$_2$—, —C=CH—, —C≡C—, —OCH₂CH₂O—, —NR—, —CONR—, —R₂C—, straight chain alkylene radicals having from 1 to 8 carbon atoms, branched chain alkylene radicals having from 2 to 8 carbon atoms and cycloalkylene radicals having from 5 to 9 carbon atoms, said bisphenylene radical being connected at positions selected from among the meta and para positions, and, as the last to be selected member of the group, B represents those atoms such that

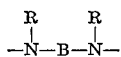

is a radical having the formula:

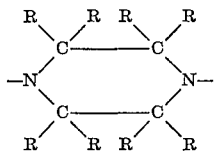

and R in each occurrence above represents a member selected from the group consisting of a hydrogen atom and an alkyl group having from 1 to 4 carbon atoms, said polyurethane being characterized in that a film thereof has a Kohinoor hardness of at least 2H–H.

2. A polyurethane as defined by claim 1 wherein A is a mixture of

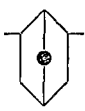

and

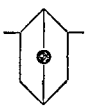

radicals and B is an ethylene radical.

3. A polyurethane as defined by claim 1 wherein A is

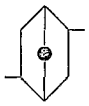

radical and B is a 1,4-cyclohexanebismethylene radical.

4. A polyurethane as defined by claim 1 wherein A is a

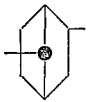

radical and B is a 4,4'-methylenedianiline radical.

5. A polyurethane as defined by claim 1 wherein A has at least one of the following formulas:

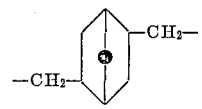

and

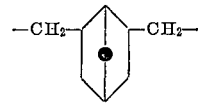

6. A polyurethane as defined by claim 5 wherein B is a 1,4-cyclohexanebismethylene radical.
7. A polyurethane as defined by claim 5 wherein B is an ethylene radical.
8. A polyurethane as defined by claim 5 wherein B is a

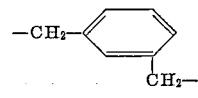

radical.
9. A polyurethane as defined by claim 5 wherein B is a 2,2-dimethyl-1,3-propylene radical.
10. A polyurethane as defined by claim 5 wherein the group of atoms:

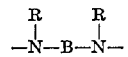

represents a piperazine radical having the formula

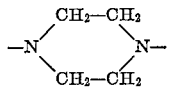

References Cited by the Examiner
UNITED STATES PATENTS

| | | | |
|---|---|---|---|
| 2,666,748 | 1/1954 | Arthur | 252—438 |
| 2,708,617 | 5/1955 | Magat | 260—77.5 |
| 2,800,464 | 7/1957 | Miller | 260—77.5 |
| 2,900,368 | 8/1959 | Stilmar | 260—77.5 |
| 2,926,145 | 2/1960 | McConnell | 260—77.5 |
| 2,952,666 | 9/1960 | Coover | 260—77.5 |
| 3,184,435 | 5/1965 | Caldwell et al. | 260—77.5 |

LEON J. BERCOVITZ, *Primary Examiner.*